United States Patent [19]

McClure

[11] 4,196,840
[45] Apr. 8, 1980

[54] METHOD AND APPARATUS FOR HOLDING TWO SEPARATE METAL PIECES TOGETHER FOR WELDING

[75] Inventor: Sidney R. McClure, Elkridge, Md.

[73] Assignee: The United States of America as represented by the Administrator of the National Aeronautics and Space Administration, Washington, D.C.

[21] Appl. No.: 894,213

[22] Filed: Apr. 6, 1978

[51] Int. Cl.$^2$ ............................................. B23K 37/04
[52] U.S. Cl. ............................... 228/212; 228/44.1 R; 228/222; 269/287; 219/160; 219/161
[58] Field of Search .......................... 269/287, 48, 52; 228/44.1 R, 49 R, 212, 46, 222; 219/159, 160, 161, 64; 279/41 R, 51; 29/280, 281.1, 282, 559; 53/452, 563

[56] References Cited
U.S. PATENT DOCUMENTS

| | | | |
|---|---|---|---|
| 2,382,359 | 8/1945 | Weightman | 29/282 |
| 2,534,124 | 12/1950 | Hasselhorn | 228/184 X |
| 2,755,709 | 7/1956 | Kalbow | 269/287 X |
| 2,797,303 | 6/1957 | Kershaw | 219/64 |
| 2,888,282 | 5/1959 | Naimer | 279/51 X |
| 3,239,644 | 3/1966 | Nyborg et al. | 219/159 X |
| 3,756,490 | 9/1973 | Zimmerman | 228/46 |

Primary Examiner—Francis S. Husar
Assistant Examiner—K. J. Ramsey
Attorney, Agent, or Firm—Robert D. Marchant; John R. Manning; John O. Tresansky

[57] ABSTRACT

A method of holding two separate metal pieces together for welding including the steps of overlapping a portion of one of the metal pieces on a portion of the other metal piece; encasing the overlapping metal piece in a compressible device; drawing the compressible device into an enclosure; and compressing a portion of the compressible device around the overlapping portions of the metal pieces for holding the metal pieces under constant and equal pressure during welding thereof. The preferred apparatus for performing the method utilizes a support mechanism to support the two separate metal pieces in an overlapping configuration; a compressible device surrounding the support mechanism and at least one of the metal pieces; and a compressing device surrounding the compressible device for compressing the compressible device around the overlapping portions of the metal pieces, thus providing constant and equal pressure at all points on the overlapping portions of the metal pieces.

19 Claims, 8 Drawing Figures

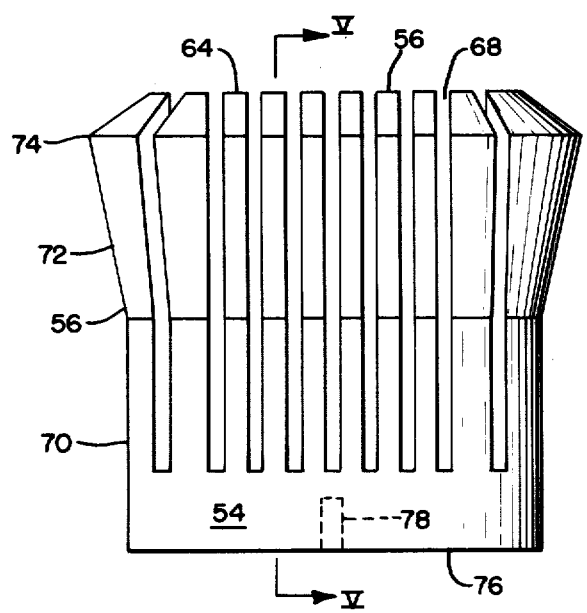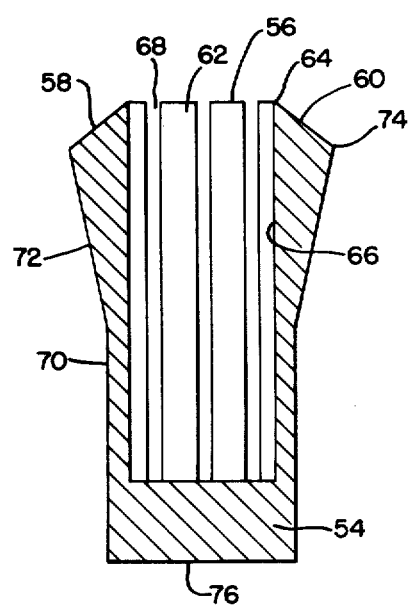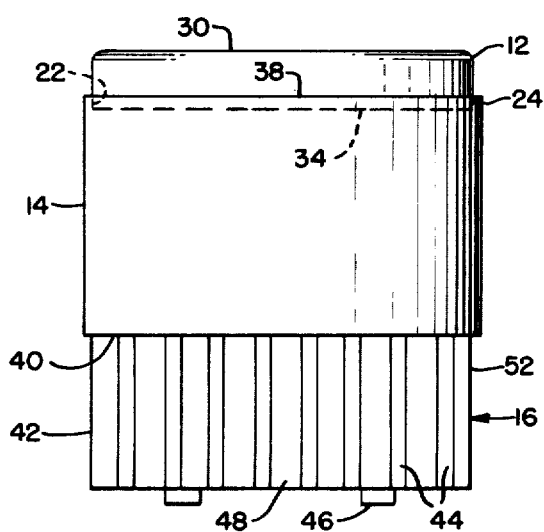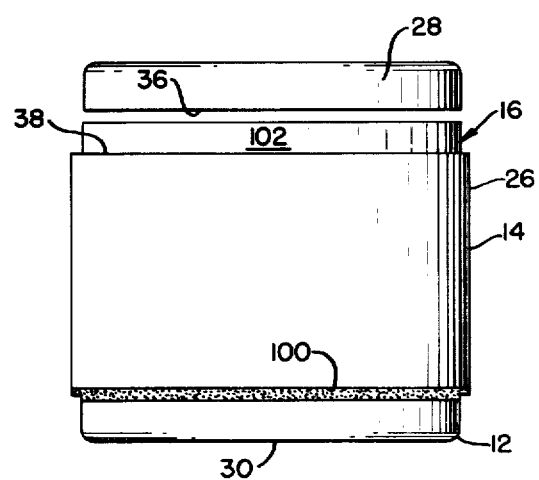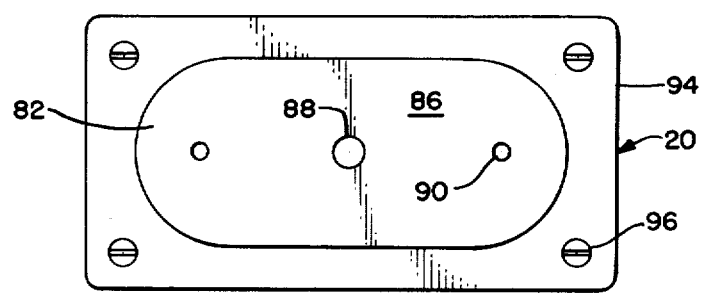

METHOD AND APPARATUS FOR HOLDING TWO SEPARATE METAL PIECES TOGETHER FOR WELDING

ORIGIN OF THE INVENTION

This invention described herein was made by an employee of the United States Government and may be manufactured and used by or for the government for governmental purposes without the payment of any royalties thereon or therefore.

SUMMARY OF THE INVENTION

This invention relates generally to welding fixtures and more particularly to a method and apparatus for holding two separate metal pieces under constant and equal pressure during welding.

With the advent of miniaturized electronics it became possible to place electronic components in smaller containers. One area which benefited from smaller packaging of electronics has been the medical field. Previously, electronic components which were used to operate such devices as heart pacemakers and tissue stimulators had to be carried outside the body in rather bulky containers. The electronics were connected to the pacemaker and stimulators through the body.

With miniaturized electronics the components can be packaged in relatively small containers and placed within the body with the pacemakers and tissue stimulators. It is desirable for the container to be made as light weight as possible so that it will be comfortable to the person having the container implanted in his body. This can be accomplished by chosing a relatively light weight metal for fabricating the container, such as a titanium alloy, and by making the metal as thin as possible. Another reason for making the metal as thin as possible is to lower the charging time for the batteries that power the electronics. To prevent a person from having to be operated on each time the batteries need charging it is advantageous to recharge the batteries while the electronics remain implanted in the body. The thinner the metal container, the easier and faster the batteries can be recharged.

Unfortunately, the packaging technology has not kept pace with the electronic miniaturization technology in that the containers holding the electronic components and relatively thick and heavy. The problem involved is the welding of the tops and bottoms to the cylindrical midsection to encase the electronic components therein when the metal is very thin. To weld the top and bottom sections to the midsection, the midsection overlaps the top and bottom sections and then the overlapping portions are welded to form an encasement for the components. To form a proper weld, the overlapping portions should abut at all portions along the periphery. This can only be achieved when the metal is relatively thick. When very thin metal is used, the overlapping joint is very difficult to weld because the thin metal when held in place tends to be wrinkled causing air gaps between the overlapping portions of the joint. These air gaps prevent a proper weld from being made.

Welding fixtures have been developed for holding thicker metal parts in overlapping relationship where the problem of air gaps forming between the overlapping metal pieces does not occur. One such fixture is used to form a cylinder from a flat sheet of metal. The fixture uses an internal expandable mandrel that fits within a holding block. A piece of sheet metal wraps around the mandrel so that the two ends slightly overlap. The mandrel is expanded and the metal sheet is held against the block. The seam of the sheet is exposed through the block for welding. The disadvantage of such a fixture is that it cannot be used for welding caps to cylinders and it can only be used with thicker metals because it cannot apply constant and equal pressure along the seam to prevent air gaps from forming between the overlapping portions.

Other fixtures have been devised to weld caps to cylindrical midsections but these can only be used with thick metals because of the air gap problem as mentioned above. In addition to only welding thick metals, these fixtures are usually hydraulically or pneumatically operated which make them rather large, complicated and expensive.

Accordingly, one object of this invention is to provide a novel method of holding two separate metal pieces together for welding.

Another object of the invention is to provide an improved method of applying constant and equal pressure along the seam of two separate overlapping pieces of metal prior to welding.

Still another object of the invention is to provide a novel method of preventing air gaps between two separate overlapping pieces of metal for welding.

A further object of the instant invention is to provide a method of welding two separate metal pieces together that are substantially two mils thick.

A still further object is to provide a method of welding two mil thick tops and bottoms to a two mil thick cylindrical mid-section for encasing electronic components therein.

Another object of the invention is to provide a new and improved apparatus for welding two separate metal pieces together.

Still another object of the invention is to provide a new and improved holding apparatus which applies constant and equal pressure along the seam of two separate overlapping pieces of metal for welding.

A further object of the instant invention is to provide a novel holding apparatus which prevents air gaps from forming between two separate overlapping pieces of metal for welding.

A still further object is to provide a holding apparatus which holds two separate overlapping metal pieces substantially two mils thick together for welding.

Another object of this invention is to provide a holding apparatus which holds two mil thick tops and bottoms to a two mil thick cylindrical midsection for welding and for encasing electronic components therein.

One other object is to provide a holding apparatus for welding two mil thick tops and bottoms to a two mil thick cylindrical midsection that is relatively simple, compact, and inexpensive.

Briefly, in accordance with one aspect of this invention, these and other objects are attained by providing a method of holding two separate metal pieces together for welding involving the steps of overlapping a portion of one of the metal pieces on a portion of the other metal piece, encasing the overlapping metal piece in a compressible member, drawing the compressible member into an enclosure, and compressing a portion of the compressible member around the overlapping portions of the metal pieces for holding the metal pieces under substantially constant and equal pressure during welding.

Further, in accordance with another aspect of this invention there is provided an apparatus for holding two separate metal pieces together for welding having a supporting mechanism which supports the metal pieces in overlapping relationship. A compressible device surrounds the supporting mechanism and at least one of the metal pieces. A compressing device compresses the compressible device around the overlapping portions of the metal pieces for holding the metal pieces under substantially constant and equal pressure during welding thereof.

The above and further objects and novel features of the invention will appear more fully from the following detailed description when read in connection with the accompanying drawings.

BRIEF DESCRIPTION OF THE DRAWINGS

In the drawings wherein like parts are designated alike:

FIG. 4 is a side view of the compressible member of FIG. 3 showing the flexible members and the tapered portions;

FIG. 5 is an end view in cross-section of the compressible member of FIG. 4 taken along the lines V—V showing the base and tapered portions of the flexible members;

FIG. 6 is a side view of the metal pieces of FIG. 3 in overlapping relationship and being supported on a heat sink mandrel for welding one of the end cap metal pieces to one of the open ends of the cylindrical center metal piece;

FIG. 7 is a side view of the metal pieces of FIG. 3 showing the end cap metal piece welded to the cylindrical metal piece, the components inserted in the cylindrical metal piece and another metal end cap for welding to the cylindrical metal piece; and FIG. 8 is a top view of the enclosure of FIG. 2 showing the aperture and the screws for connecting the top plate to the housing.

DETAILED DESCRIPTION

Figure 1:
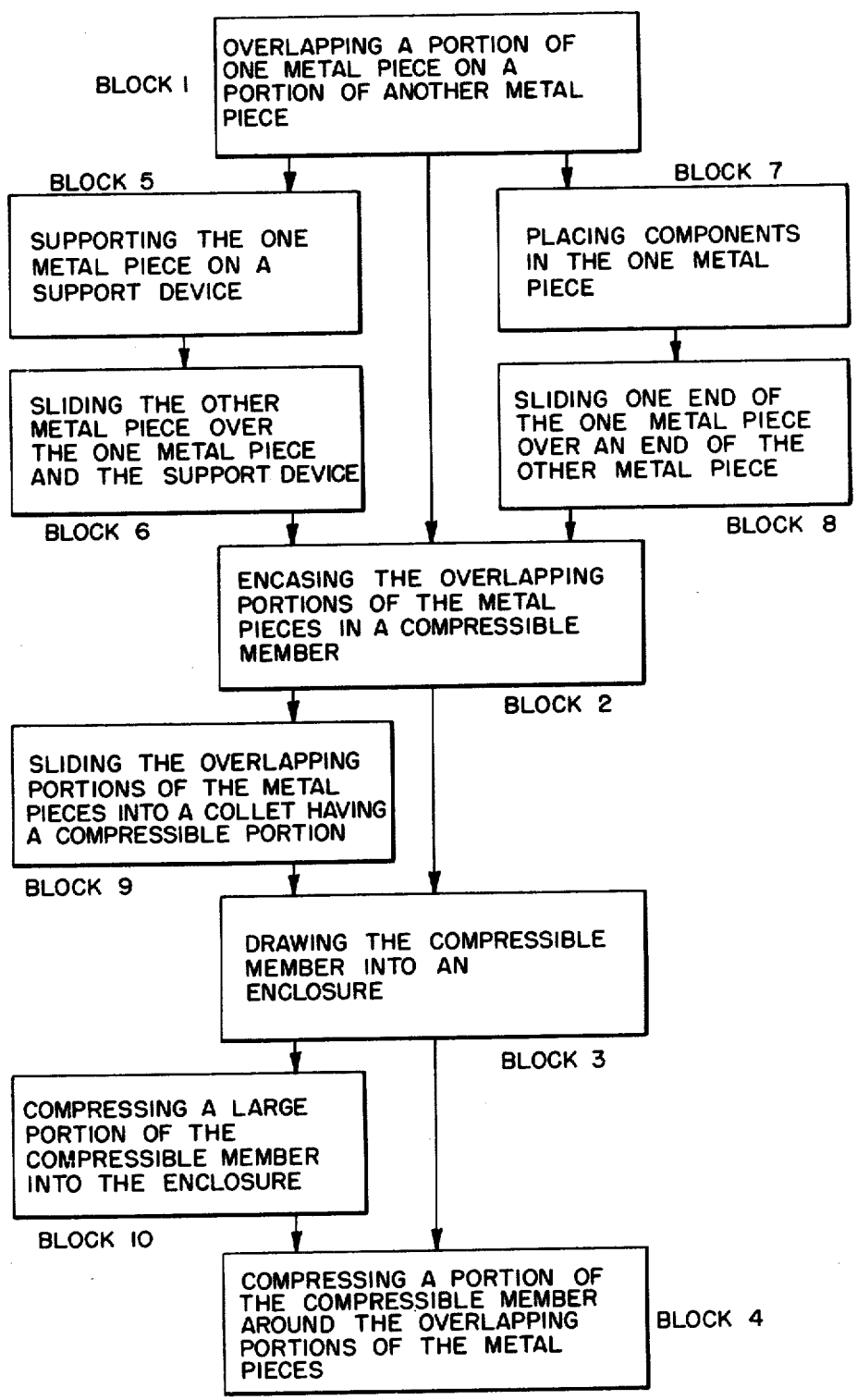
FIG. 1 is a block flow diagram showing the process steps of holding two separate metal pieces together for welding.

Referring to FIG. 1, the method of holding two separate metal pieces together for welding is generally shown in blocks 1 through 4. Block 1 illustrates the step of overlapping a portion of one metal piece on a portion of another metal piece. Block 2 illustrates the second step of encasing the overlapping portions of the metal pieces in a compressible member. Block 3 illustrates the third step of drawing the compressible member into an enclosure. Block 4 illustrates the fourth step of compressing a portion of the compressible member around the overlapping portions of the metal pieces for holding the metal pieces under substantially constant and equal pressure during welding thereof.

More specifically, the step illustrated in Block 1 is broken down into two separate processes. The process shown by Blocks 5 and 6 illustrate the steps to be carried out when welding a metal cap to one of two open ends of a cylindrical metal tube or band. The process shown by Blocks 7 and 8 illustrate the process to be carried out when a second metal cap is to be welded to the remaining open end of the cylindrical metal tube after selected components are placed into the cylindrical metal tube for encapsulation.

Referring to Blocks 5 and 6, the process for welding the metal cap to the metal tube includes the step of supporting one metal piece in the form of a metal cap on a support device as illustrated by Block 5. The next step is sliding the other metal piece in the form of a cylindrical tube over the metal cap and support device until a portion of one end of the cylindrical tube overlaps a portion of the metal cap as illustrated by Block 6. Preferably, the support device in the step illustrated by Block 5 is a heat sink mandrel to absorb the heat during the welding process.

Referring to Blocks 7 and 8, the process for welding the second metal cap to the remaining open end of the cylindrical tube includes the step of placing components to be encapsulated into the cylindrical tube which has already had one metal cap welded to one open end of the cylindrical tube as illustrated by Block 7. The next step is sliding the one open end of the cylindrical metal tube over a portion of an open end of another metal cap as illustrated by Block 8.

The step of encasing as illustrated by Block 2 includes the step of sliding the overlapping portions of the metal cylindrical tube and metal cap into a collet having a compressible portion as illustrated by Block 9. Preferably, the collet used includes a plurality of flexible members that extend from a base forming the compressible portion.

The step of drawing as illustrated by Block 3 includes the step of compressing a portion of the compressible member that is larger than the opening of the enclosure into the enclosure as illustrated by Block 10.

The step of compressing as illustrated in Block 4 is preferably accomplished by providing the flexible members with a tapered portion that has an outer periphery that is larger than the periphery of the opening of the enclosure. Thus, when the collet is drawn into the enclosure the tapered portions of the flexible members contact the edge of the enclosure compressing the flexible members inward around the overlapping portions of the metal cylindrical tube and metal cap.

Although, this method can be employed for welding any thickness of metal used for cylindrical tube and caps it is particularly suitable for welding very thin metal parts. This method will allow accurate welding of metal pieces that are substantially two mils thick. This is accomplished because when drawn into the enclosure the flexible members provide a substantially constant and equal pressure around the periphery of the overlapping portions of the cylindrical metal tube and the metal cap which prevents air gaps from forming between the overlapping portions, thereby producing a defect-free weld.

The above described method will be set forth in more detail and will become clearer when the apparatus and operation thereof for accomplishing the method is later described.

Figure 2:
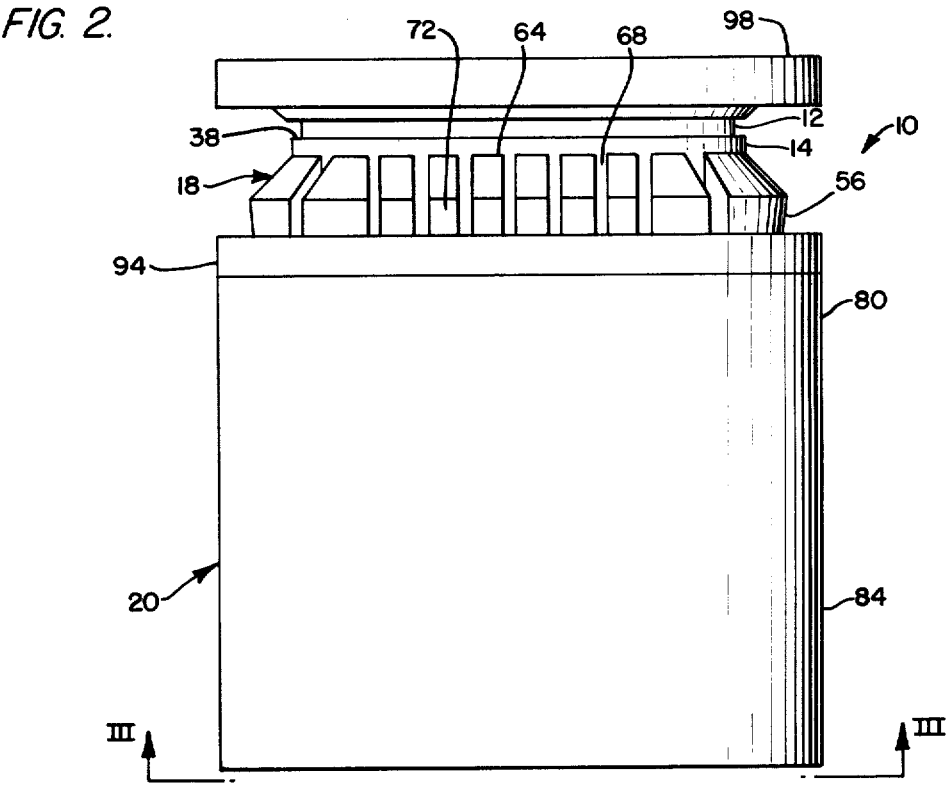
FIG. 2 is a side view of the apparatus for performing the process steps of FIG. 1 of the present invention.
Figure 3:
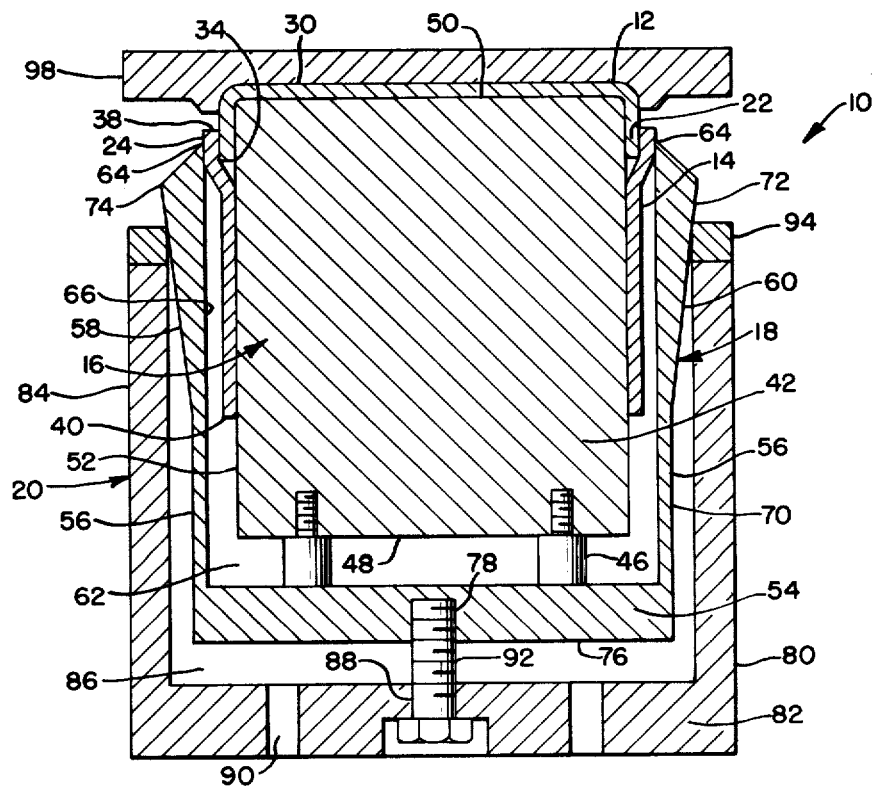
FIG. 3 is a side view in cross-section of the apparatus of FIG. 2 taken along the lines of III—III showing the various parts coupled together for welding the overlapping portions of the metal pieces.

FIGS. 2 and 3 generally show the preferred device for performing the above described method of FIG. 1. Generally, the preferred apparatus, denoted generally by numeral 10, for holding two separate metal pieces 12 and 14 together for welding includes a supporting device, denoted generally by numeral 16, for supporting metal pieces 12 and 14 in overlapping relationship. A compressible device, denoted generally by numeral 18, surrounds supporting device 16 and at least one of metal pieces 12 and 14. A compressing device denoted generally by numeral 20, compresses compressible device 18 around overlapping portions 22 and 24 of metal pieces 12 and 14, respectively, for holding metal pieces 12 and 14 under substantially constant and equal pressure during welding.

More specifically, and referring to FIGS. 3, 6, and 7, the welding process for forming a solid container, denoted generally by numeral 26, being composed of metal pieces 12, 14, and 28 is firstly to weld metal piece 12 to metal piece 14 and secondly to weld metal piece 28 to metal piece 14. Metal piece 12 is the bottom and metal piece 28 is the top of container 26. Metal pieces 12 and 28 are formed into metal caps which are closed at ends 30 and 32, respectively and open at ends 34 and 36, respectively in any conventional manner such as stamping. Metal piece 14 is formed into a cylindrical tube which is open at both ends 38 and 40 in any conventional manner such as by welding the ends of a sheet of metal together.

Metal pieces 12, 14, and 28 may be made from any type of metal such as titanium alloy. Apparatus 10 may be used to weld any thickness of metal pieces 12 and 28 to metal piece 14, however, apparatus 10 is preferably used when metal pieces 12, 14, and 28 are very thin such as, for example, titanium alloy substantially two mils thick. Prior art welding fixtures are unable to weld metal pieces together that are very thin. Referring to FIG. 3, overlapping portion 24 of cylindrical tube 14 is shown as having a diameter larger than end 40. This is for illustration purposes to demonstrate the overlapping relationship only and when actual metal pieces are used overlapping end 24 has the same diameter as end 40 because when very thin metal is used it is flexible and overlapping can be achieved successfully without increasing the diameter of end portions 38 and 40.

Referring now to FIGS. 2, 3, and 6 which illustrate the apparatus used for the first welding process of welding the bottom metal cap 12 to the cylindrical metal tube 14 it is preferred that supporting device 16 for bottom cap 12 and cylindrical metal tube 14 be a solid rigid structure 42 shape substantially like cap 12 and tube 14. Structure 42 is preferably a heat sink mandrel 42 having a plurality of spaced stria 44 extending the length thereof. Although any material may be used for mandrel 42 it is preferred that mandrel 42 be made from copper or a copper alloy. Mandrel 42 includes a pair of nob screws 46 that are threaded into bottom 48. Screws 46 are used to adjust the height of mandrel 42, as will be explained later. Mandrel 42 is used to absorb the excess heat generated when cap 12 and tube 14 are welded together. Cap 12 fits over end 50 of mandrel 42 and is supported thereon so that open end 34 extends over the outer periphery 52 of mandrel 42. Cylindrical tube 14 fits over cap 12 and surrounds outer periphery 52 so that end 38 overlaps end 34 of cap 12 forming overlapping portions 22 and 24. Tube 14 is held in place by frictional contract with periphery 52 of mandrel 42.

Referring now to FIGS. 2, 3, 4, and 5 which illustrate compressible device 18, compressible device 18 includes a base 54 and a plurality of flexible members 56 extending from base 54. Each opposed flexible member 54, shown as members 58 and 60 in FIGS. 3 and 5, are spaced apart forming a central opening 62 extending from the tips 64 of flexible members 56 down to base 54. Opening 62 is substantially shaped the same as mandrel 42, cap 12, and tube 14, however, the inner periphery 66 of flexible members 56 is substantially larger than the outer periphery 52 of mandrel 42.

Flexible members 56 are spaced from adjacent flexible members 56 forming a space 68 therebetween to give each member its flexibility. Flexible members 56 have a straight portion 70 and an outwardly extending tappered portion 72. Preferably, tappered portions 72 begin at substantially the midpoint of flexible members 56 and tapper outwardly to points 74 and then tapper inwardly to form end tips 64. The outer periphey of tappered portions 72 at points 74 is substantially greater than the outer periphery of base 54. Although the above is preferred for flexible members 56 it should be understood that other configurations may be used such as, for example, straight portions 70 can be eliminated and tappered portions 72 can begin at base 54. Base 54 of compressible device 18 includes a bottom surface 76 which includes a threaded opening 78 extending into base 54. Preferably, compressible device 18 is made from a flexible metal such as brass, however, any material can be used as long as it has flexibility and a high melting point such as steel.

Mandrel 42, cylindrical metal tube 14 and metal cap 12 are placed within opening 62 of compressible device 18. Screw caps 46 are adjusted so that when they are in contract with base 54 tips 64 of flexible members 56 are adjacent to and surrounding overlapping portions 22 and 24 of cap 12 and tube 14 respectively.

Referring now to FIGS. 2, 3, and 8, compressing device 20 includes an enclosure or container 80 which has a base 82 and side walls 84. Enclosure 80 also includes a central opening 86. The inner periphery of walls 84 forming opening 86 is larger than the outer periphery of base 54 of compressible device 18 and smaller than the outer periphery of flexible members 56 at points 74 of tappered portions 72. Compressing device 20 also includes a non-threaded opening 88 extending through base 82 and is axially aligned with threaded opening 78 in base 54 of compressible device 18. A plurality apertures 90 also extended through base 82. A threaded screw 92 extends through opening 86. Preferably, enclosure 80 is made of a metal such as aluminum to make apparatus 10 as light as possible. When enclosure 10 is aluminum it is preferred that a strong metal cap 94 such as stainless steel be secured to the top of walls 84 such as by screws 96. Although the above is preferred, it should be understood that enclosure 80 may be made out of any material such as stainless steel. In this case there is no need for a cap 94.

Compressible device 18 surrounding cylindrical metal tube 14, metal cap 12, and mandrel 42 are placed in opening 86 of enclosure 80. Because the outer periphery of base 54 of compressible device 18 is less than the inner periphery of walls 84 of enclosure 80, compressible device 18 will fit within opening 86. However, because the outer periphery of points 74 of flexible members 56 is larger than the inner periphery of walls 84, compressible device 18 will only drop into opening 86 until the tappered portions 72 of flexible members 56 contact cap 94. Screw 92 is then threaded into opening 78 of base 54. As screw 92 is turned, compressible device 18 is pulled into opening 86 of enclosure 80 causing flexible members 56 to be compressed inward as tappered portions 72 slide against walls 84. When flexible members 56 are compressed inward, points 64 apply constant and equal pressure against overlapping portions 22 and 24 of cap 12 and tube 14, respectively. This constant and equal pressure tightly holds overlapping portions 22 and 24 together against mandrel 42 preventing air gaps from forming between overlapping portions 22 and 24 which causes poor welds. Preferably, an external heat sink 98 is supported on top end 30 of cap 12 to absorb the heat from welding. Apparatus 10 is connected to a conventional welding fixture (not shown) through openings 90 in enclosure 80. Overlapping portions 22 and 24 are welded together using conventional electron beam, laser, or tungsten inert gas shielded arc welding procedures forming a welded joint 100, FIG. 7, between bottom cap 12 and tube 14.

After weld joint 100 is formed, compressible device 18 is removed from enclosure 80 by unscrewing screw 92 from base 54. Mandrel 42 is removed from compressible device 18 and cap 12 and tube 14, now welded together as one unit, are removed from mandrel 42.

Referring now to FIG. 7, the second welding process is performed to encapsulate an electronic package 102 within container 26. This is accomplished by using the same apparatus 10 as previously described to weld top cap 28 to open end 38 of cylindrical tube 14 except that mandrel 42 is not used. An electronic package 102 such as used to control a heart pacemaker or tissue stimulator is inserted through open end 38 of tube 14. Top cap 28 is supported on top of package 102 so that end 38 of tube 14 overlaps end 36 of cap 28. The method and apparatus for welding the overlapping ends 36 and 38 together is the same as previously described for welding cap 12 to tube 14 and therefore will not be further described.

A method and apparatus have been disclosed for holding two separate metal pieces together for welding. Obvious modifications and variations of the invention are possible in light of the above teachings. It is to be understood, therefore, that within the scope of the appended claims the invention may be practiced otherwise than as specifically disclosed.

I claim:

1. A method of holding two separate metal pieces together for welding, comprising the steps of:
   (a) overlapping a portion of one of said metal pieces on a portion of said other metal piece, said step of overlapping including the steps of;
       (1) supporting said other metal piece on a support means, and
       (2) sliding said one metal piece formed as a metal tube over said supported other metal piece and said support means until one end of said metal tube overlaps a portion of said other metal piece;
   (b) encasing said overlapping metal pieces in a compressible member;
   (c) drawing said compressible member into an enclosure; and
   (d) compressing a portion of said compressible member around said overlapping portions of said metal pieces for holding said metal pieces under substantially constant and equal pressure during welding thereof.

2. The method of claim 1 wherein said support means is a heat sink mandrel.

3. The method of claim 2 wherein said other metal piece and said metal tube are approximately two mils thick.

4. The method of claim 1 wherein the step of encasing includes the step of sliding said overlapping metal pieces into a collet means until a compressible portion of said collet means is substantially aligned with said overlapping portions of said metal pieces.

5. The method of claim 4 wherein said collet means has a plurality of flexible members extending from a base forming said compressible portion.

6. The method of claim 1 wherein said step of drawing includes the step of compressing a portion of said compressible member that is larger than the opening of said enclosure into said enclosure.

7. A method of holding two separate metal pieces substantially two mils thick together for welding, comprising the steps of;
   (a) overlapping a portion of one of said metal pieces on a portion of said other metal piece, said step of overlapping including the steps of:
       (1) supporting said other metal piece on a support means, and
       (2) sliding said one metal piece formed as a metal tube over said supported other metal piece and said support means until one end of said metal tube overlaps a portion of said other metal piece;
   (b) sliding said overlapping metal pieces into a compressible collet means until a compressible portion of said collet means is substantially aligned with said overlapping portions of said metal pieces;
   (c) placing a rigid portion and a portion of said compressible portion of said collet means into a rigid enclosure means; and
   (d) drawing another portion of said compressible portion of said collet means into said enclosure means, said another portion of said compressible portion being larger than the opening of said enclosure means for compressing said another portion of said compressible portion around said overlapping metal pieces under substantially constant and equal pressure during welding thereof.

8. The method of claim 7 wherein said support means is a heat sink mandrel.

9. The method of claim 1 wherein said support means is an electronic package.

10. The method of claim 7 wherein said support means is an electronic package.

11. An apparatus for holding two separate metal pieces together for welding comprising:
    means for supporting said metal pieces, said supporting means including;
        a substantially flat surface portion for supporting one of said metal pieces thereon, and
        another surface portion extending substantially transverse from said flat surface portion for frictionally supporting said other metal piece in overlapping relationship with a portion of said one metal piece;
    compressible means surrounding said supporting means, said compressible means including;
        a base, and
        a plurality of flexible members extending from said base, said members surrounding said supporting means for engaging said overlapping portions of said metal pieces; and
    means for compressing said compressible means around said overlapping portions of said metal pieces for holding said metal pieces under substantially constant and equal pressure during welding thereof.

12. The apparatus of claim 11 wherein said supporting means includes a mandrel.

13. The apparatus of claim 12 wherein said mandrel is a heat sink.

14. The apparatus of claim 11 wherein each of said flexible members is spaced apart from adjacent ones of said flexible members.

15. The apparatus of claim 14 wherein said flexible members taper outwardly toward the terminal portion of said flexible members.

16. The apparatus of claim 15 wherein said outward taper begins at substantially the center of said flexible members.

17. The apparatus of claim 16 wherein said base includes a substantially flat portion opposed from said flexible members and having a threaded aperture extending there through.

18. The apparatus of claim 17 wherein said compressing means includes:
a hollowed enclosure means open at one end, said open end having an opening substantially larger than said base and substantially smaller than said tapered portions of said compressible means; and
means for drawing said compressible means into said open end of said hollowed enclosure means, said flexible members being compressed against said overlapping portions of said metal pieces when said tapered portions contact said enclosure means.

19. The apparatus of claim 18 wherein said drawing means includes:
a closed end opposed from said open end on said hollowed enclosure means having an aperture extending there through in axial alignment with said threaded aperture in said base of said compressible means; and
screw means extending through said aperture in said closed end and threaded in said threaded aperture in said base of said compressible means for drawing said compressible means within said hollowed enclosure means when said screw means is threaded in said threaded aperture.

* * * * *